United States Patent [19]

Hoadley

[11] 4,236,806
[45] Dec. 2, 1980

[54] DENTAL FILM PACKET AND PROCESSOR THEREFOR

[76] Inventor: Howard W. Hoadley, 9143 Petit Ave., Sepulveda, Calif. 91343

[21] Appl. No.: 650,954

[22] Filed: Jan. 21, 1976

[51] Int. Cl.³ .............. G03D 9/02; G03B 41/16; G03C 5/16; G03C 1/48
[52] U.S. Cl. .............. 354/303; 250/477; 250/478; 354/297; 354/315; 430/497; 430/966
[58] Field of Search .............. 354/297, 303, 304, 305, 354/307, 310, 312, 315, 354, 301, 302; 96/76 C; 250/477, 478; 430/497, 966

[56] References Cited

U.S. PATENT DOCUMENTS

| | | | |
|---|---|---|---|
| 2,455,125 | 11/1948 | Land | 354/304 X |
| 2,565,378 | 8/1951 | Land | 250/477 |
| 2,747,103 | 5/1956 | Fairbank et al. | 354/297 X |
| 3,030,207 | 4/1962 | Land | 96/76 C X |
| 3,195,436 | 7/1965 | Decrop | 354/312 |
| 3,280,718 | 10/1966 | Decrop | 354/312 |
| 3,379,879 | 4/1968 | Dicker et al. | 354/301 X |
| 3,430,042 | 2/1969 | Neri | 354/301 X |
| 3,541,938 | 11/1970 | Harvey | 354/304 X |
| 3,714,876 | 2/1973 | Nerwin | 354/85 X |
| 3,714,881 | 2/1973 | Bowlby | 354/307 |
| 3,788,205 | 1/1974 | Pasieka et al. | 354/304 |

*Primary Examiner*—Fred L. Braun
*Attorney, Agent, or Firm*—John T. Matlago

[57] ABSTRACT

Apparatus for processing dental X-ray film chips includes a film packet enclosing a film chip with pods containing developer material on one end thereof and pods containing fixer material on the other end thereof. The packet with the exposed film chip is positioned in a processor with pressure roller adjacent each end thereof. The processor transports the packet past one of the pressure rollers to rupture the developer pods and evenly spread the developer material therein over the surfaces of the film chip. After a preset developer period, the processor transports the packet past the other pressure roller to rupture the fixer pods and evenly spread the fixer material therein over the surfaces of the film chip. After a preset fixer period the processor returns the packet to its original position for removal therefrom.

9 Claims, 13 Drawing Figures

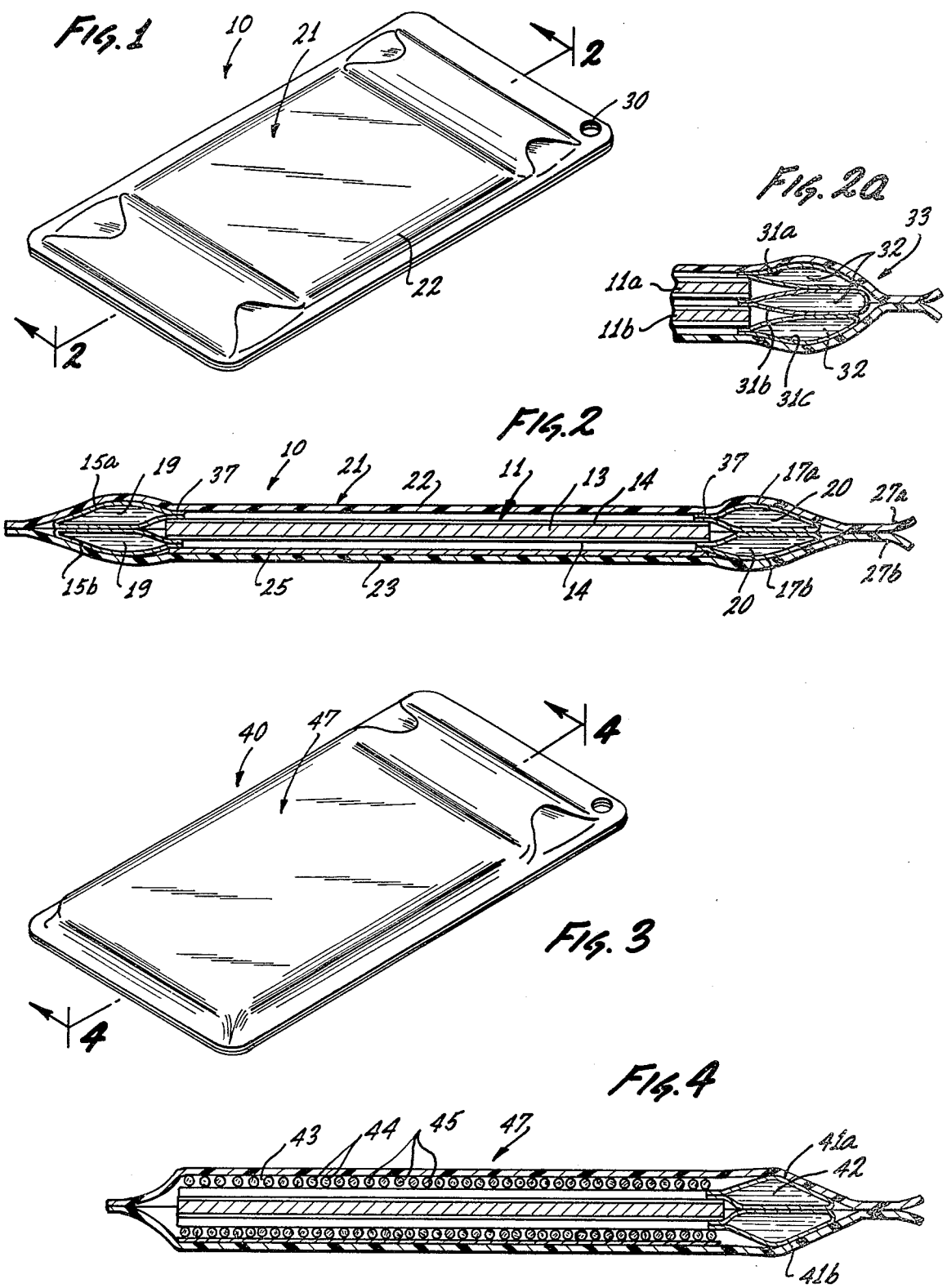

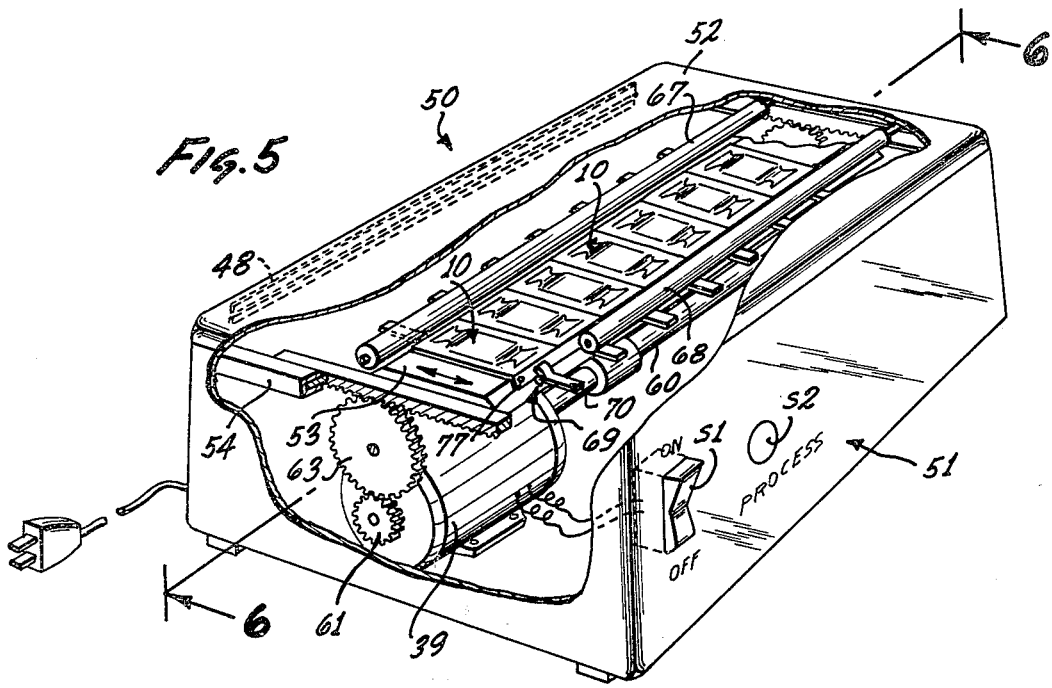
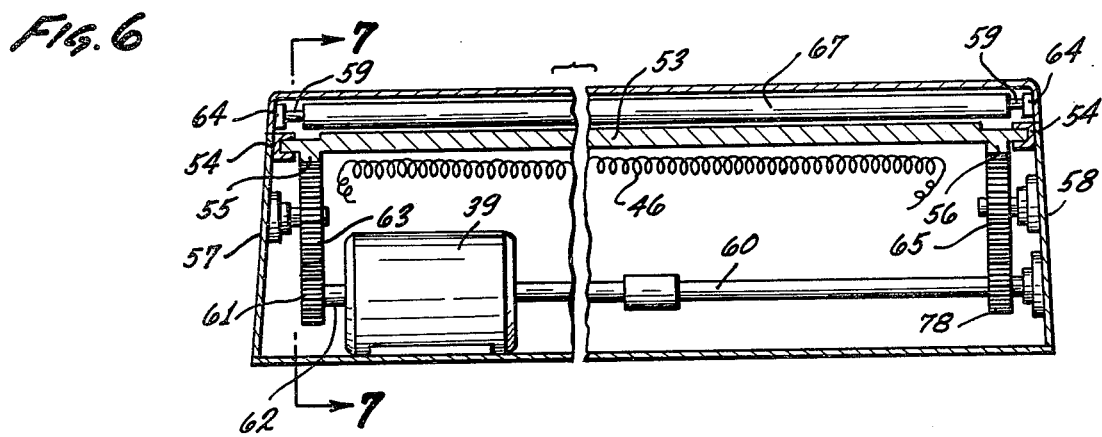
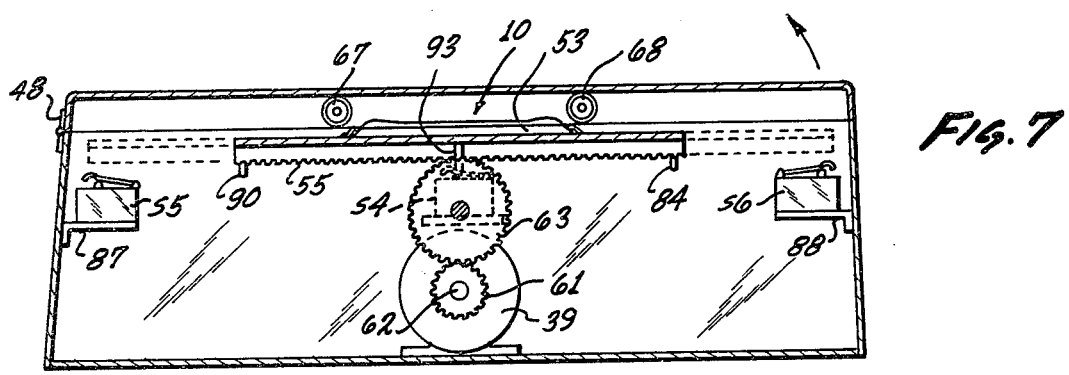

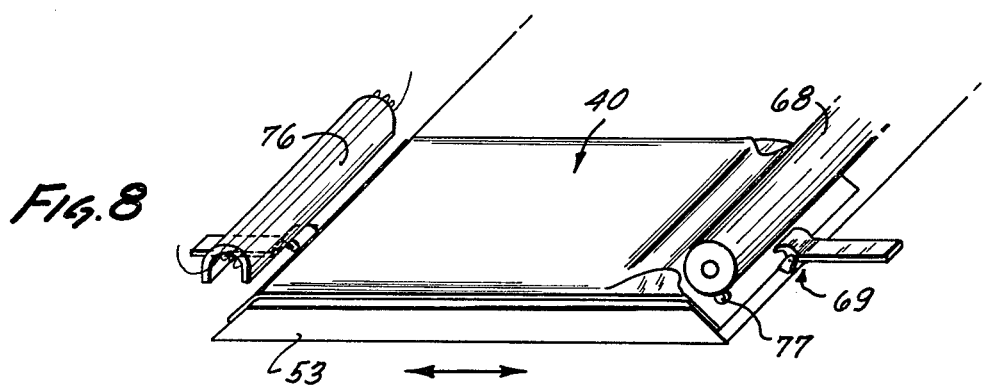
Fig. 8
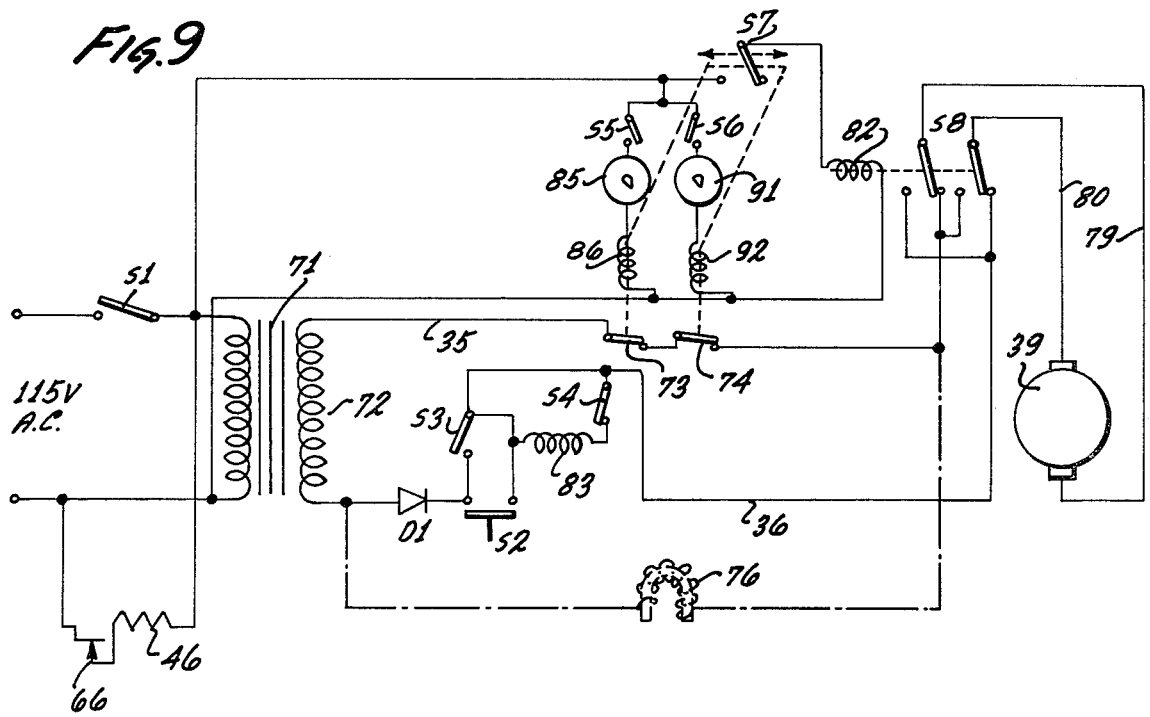
Fig. 9
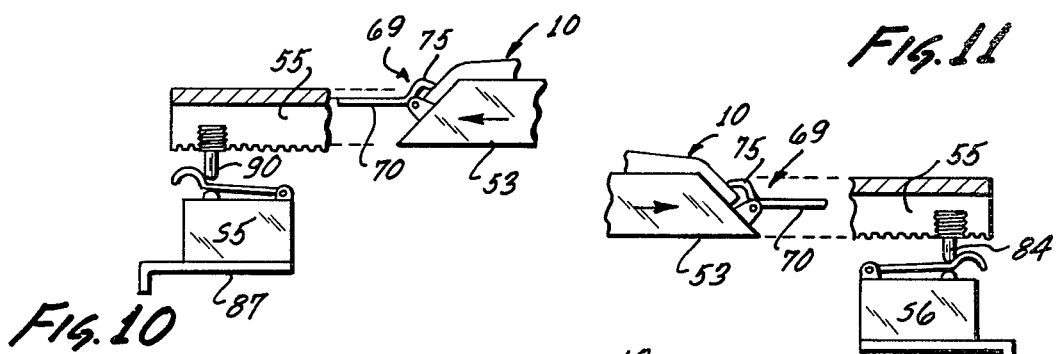
Fig. 10
Fig. 11
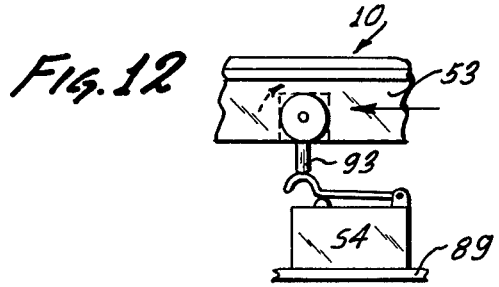
Fig. 12

DENTAL FILM PACKET AND PROCESSOR THEREFOR

This invention relates to apparatus for developing film chips exposed to X-rays and more particularly to a dental film chip packet which stores the chemical materials needed to process the film chip in such a manner as to facilitate the processing thereof by an automatic processor.

There presently is a need for an apparatus and a procedure which would facilitate the rapid automatic processing of an exposed X-ray film chip in the dentist's office without the need of a darkroom. Thus, by providing for the immediate automatic processing in a normally lit room of a film chip contained in a packet which also includes the necessary processing chemical materials, the dentist is enabled to open the packet and examine the patient's X-ray film chip for immediate diagnosis shortly after its exposure. The advantage of such a procedure is that if the processing of the film chip can be accomplished in a sufficiently short period of time, the dentist is then able to use the X-rays that he has just taken to continue with the treatment of the patient while the latter remains in the dental chair.

Prior art attempts to satisfy this need have used the approach of providing for introducing chemical processing solutions in an exposed film chip packet by use of a hypodermic needle. Another approach provides a packet having processing solution container portions which are connected by an elongated connecting portion to one end of a film container portion. Such constructional arrangements are provided so that the processing solutions need not be placed in the mouth of the patient. These procedures and forms of construction of the film chip packet complicate the steps needed to perform the processing of the film chip and accordingly do not readily lend themselves to the use of a simple, reliable, rapid, automatic processor for their performance.

Accordingly, one of the objects of the present invention is to provide an X-ray film chip packet containing chemicals needed to process the film chip which can be safely placed in the mouth of the patient.

Another object of the invention is to provide a packet for a dental X-ray film chip having the chemicals needed for its processing prepackaged therein in a manner to facilitate the automatic processing thereof.

Another object of the invention is to provide a processor which is fully automatic as to the order and the timing of the steps needed to perform the processing operations of an X-ray film chip which is prepackaged with the chemicals needed for the processing thereof.

Briefly, the preferred embodiment of the present invention provides a packet having pods of developer and fixing material disposed on opposite ends of a film chip that is enclosed therein. The entire packet containing the film chip and the pods of processing material is placed in the mouth of a dental patient and exposed to X-rays. The packet is then fastened on a platen of an automatic processor whereby the packet is first transported in one direction past a first pressure roller which serves to rupture the developer pods on one end of the packet and evenly spread the developer material therein over the upper and lower emulsion surfaces of the film chip. The platen is then reversed in direction and transports the packet in the opposite direction past a second pressure roller which serves to rupture the fixer pods on the other end of the packet and to evenly spread the fixer material therein over the upper and lower emulsion surfaces of the film chip. The platen is then returned to its position intermediate the pressure rollers where the packets are removed and opened. The film chip can then be immediately viewed in an ordinary viewer by the dentist for diagnostic purposes.

A modification of the preferred embodiment of the present invention provides a film chip packet wherein pods for fixer material, for example, are provided on only one end of the film chip. The development material is then microencapsulated as minute droplets in a carrier disposed in the form of a sheet or larger adjacent the emulsion coating on either surface of the film chip. The encapsulated droplets i.e. microcapsules of development material contain freely movable tiny magnetic particles. The pressure roller for the development step of the processor is replaced by an a.c. electromagnetic exciter. As the platen is moved past the exciter, the oscillating magnetic field produced by the exciter acts on the magnetic particles and thereby causes the encapsulated droplets to rupture to release the developer material.

With these and other related objects and advantages in view the invention consists of the construction, arrangement, and combination of the various parts of the apparatus as will be more fully understood from the following description when read in conjunction with the accompanying drawings in which:

FIG. 1 is a perspective view of a film packet in accordance with the subject invention;

FIG. 2 is an enlarged cross sectional view taken along lines 2—2 in FIG. 1 which has been exaggerated for clarity;

FIG. 2a is a view similar to FIG. 2 showing the pod arrangement on one end of a dual X-ray film chip packet;

FIG. 3 is a perspective view of another embodiment of the film packet in accordance with the present invention;

FIG. 4 is an enlarged cross sectional view as taken along lines 4—4 of FIG. 3 which has been exaggerated for clarity;

FIG. 5 is a perspective view of the automatic processor for developing the film packet of the present invention with the housing therefor partially cut away;

FIG. 6 is a cross sectional view as taken along lines 6—6 in FIG. 5;

FIG. 7 is a cross sectional view as taken along lines 7—7 in FIG. 5;

FIG. 8 is a modification of the processor showing an exciter mounted adjacent the upper end of the platen therefor;

FIG. 9 is a schematic circuit diagram of the controls for the processor of FIG. 5; and FIGS. 10, 11 and 12 illustrate the operation of the microswitches in the control circuit by actuators on the platen.

Referring to the drawings, the film packet 10 of the present invention includes a dental film chip 11 comprising a polyester substrate 13 having heavy emulsion coatings 14 of silver halide on the upper and lower surfaces thereof. Disposed on one end of the film chip 11 are upper and lower pods 15a and 15b and disposed on the other end of the film chip are upper and lower pods 17a and 17b. Each of the pods is made of a rectangular sheet of fluid impervious material such as cellophane having a coating of heat sealable thermaplastic material on its internal surface. The sheet material is folded longitudinally upon itself to form opposing walls which are heat sealed to one another along their longitudinal and end margins to form a small, relatively flat, fluid-tight chamber in which film processing materials are retained. The longitudinal marginal edges of the upper and lower pods 15a and 15b are preferably secured by an adhesive, for example, to respective upper and lower edges of the surfaces on one end of the film chip 11, and the longitudinal marginal edges of the upper and lower pods 17a and 17b are similarly preferably secured to the respective upper and lower edges of the surfaces on the end of the film chip 11. The pods 15a and 15b on one end of the film chip are filled with a body of developer material 19 which has a viscous consistency while the pods 17a and 17b on the other end of the film chip are filled with a body of fixer material 20 which likewise has a viscous consistency. As will be subsequently made clear, the longitudinal marginal seal 37 on each of the pods is made weaker than the end marginal seals thereof. Thus the application of a compressive force to the pair of pods on one end of the film chip causes the longitudinal marginal seals thereof to become unsealed resulting in a discharge of the contents of the upper and lower pods upon the respective upper and lower surfaces of the film chip.

The film chip with the pair of pods on either end thereof is enclosed in a flexible envelope 21 which is preferably formed of an upper and lower sheet 22 and 23 of synthetic plastic which is fluid impervious and opaque to visible light but not to X-rays. A lead foil 25 may be disposed and held by an adhesion on the inner surface of the lower sheet 23. The upper and lower sheets 22 and 23 forming the envelope 21 are secured to each other on all four peripheral sides thereof by a heat sealing process so that the envelope is fluid-tight. The synthetic plastic material used for the envelope has the characteristic of being capable of withstanding the processing material. Further this material has the characteristic of being saliva proof since the entire envelope 21 is inserted into the mouth of the dental patient when in use. It should now be appreciated that the utilizing of the fluid-tight pods enclosed within the fluid-tight envelope provides a double seal protection of the chemical processing materials in the packet such as to ensure that the packet can be safely placed in the mouth of the dental patient.

As shown in FIG. 2, the heat seal line on one end of the envelope is located inward of the ends of the sheets thereof to provide pull tabs 27a and 27b which are used to open the envelope subsequent to the processing of the exposed film chip. As shown in FIG. 1, a hole 30 is placed on one of the ends of the tabs 27a and 27b of the packet 10 for the purpose of identifying the fixer pod end of the envelope.

FIG. 2a shows one end of a modified film packet which includes two film chips 11a and 11b provided with three pods. An upper pod 31a has its longitudinal marginal edge secured to the upper edge surface of the upper film chip 11a. An intermediate pod 31b has its longitudinal marginal edges sandwiched between the adjacent edge surfaces of the film chips 11a and 11b. A lower pod 31c has its longitudinal marginal edge secured to the lower edge surface of the lower film chip 11b. Each of these three pods 31a, 31b, and 31c contain a body of processing material 32. A similar pod arrangement (not shown) is provided on the opposite ends of the film chips 11a and 11b. The assembly of the two film chips with the three pods on the ends thereof are enclosed in a flexible envelope 33. Such a dual X-ray film chip packet automatically provides a duplicate record of an X-ray examination which is advantageous when one of the film chips is referred to an outside consultant, for example.

An alternate embodiment of the film packet 40 is shown in FIGS. 3 and 4. Thus as shown by the sectional view taken along lines 4—4 thereof, this film packet, which includes an outer flexible envelope 47, differs from the one shown in FIG. 1 in that pods 41a and 41b are provided on only one end of the film packet for storing the fixer material 42. A coating layer 43 of a resin medium provides a carrier sheet of microcapsules containing minute droplets 44 of developer material. These droplets which are shown as a single layer, but may be in two or more layers, comprise closely adjacent spheres of development material of selected physical characteristics in which a plurality of tiny magnetic particles as indicated by the numeral 45 are freely movable. As will be described subsequently, these magnetic particles respond to the pressure of a strong oscillating magnetic field generated by an electromagnetic exciter 76 (FIG. 8) in such a manner as to rupture the carrier coating layer 43. This frees the minute droplets 44 of developer material so that the material can diffuse into the emulsion coatings of the film chip for the purpose of developing it.

Reference will next be made to the table top processor 50 shown in perspective in FIG. 5. This processor is used to simultaneously process several of the film packets 10 loaded on a platen 53 by providing for first transporting the developer pod ends thereof in one direction past a first pressure roller 67 for releasing the developer material, then transporting the fixer pod ends thereof in the opposite direction past a second pressure roller 68 for releasing the fixer material, and finally returning the film packets to their original position between the pressure rollers so that they can be removed from the processor.

Describing the processor in detail, a housing 51 is provided with a cover 52 which is held by hinges 48 on one side thereof. The platen 53 is disposed within the housing with its ends slideably engaged in a pair of fixed guideways 54 attached on the opposite inner walls 57 and 58 of the housing 51. As shown in FIG. 6, the platen 53 has a rack 55 integrally formed beneath one end thereof and a rack 56 integrally formed beneath the other end thereof. A heater element unit 46 is mounted below the platen between the racks. Located in the housing below the platen 53 is a motor 39. A pinion 61 on the shaft 62 extending from one end of the motor 39 drives a first gear 63 which meshes with the rack 55 on one end of the platen. A pinion 78 on a shaft 60 coupled to the other end of the motor drive shaft drives a second gear 65 which meshes with the rack 56 on the other end of the platen.

Mounted above and on either side of the platen 53 for cooperation therewith are the first and second pressure rollers 67 and 68. These rollers extend from one end of the housing 51 to the other and are mounted on the walls 57 and 58 thereof by pins 59 which rotate on bearings 64. The film packets 10 are successively positioned along the surface of the platen 53 with their holes 30 engaged over pins 77 provided on the platen. The film packets 10 are held in position on the platen by spring loaded clips 69 which grip the outer bent down ends of their flexible envelopes 21.

The electrical control circuit for automatically operating the processor 50 is shown in FIG. 9. When push button S1 is closed an 115 volt a.c. source is connected to the heater unit 46 which maintains the platen 53 at a temperature setting determined by a thermostat 66. The 115 volt a.c. is fed to the primary of a transformer 71, the secondary 72 of which is connected across the supply lines 35 and 36 supplying power to the motor 39. The supply line 35 connected to one side of the secondary 72 is serially connected through normally closed contacts 73 and normally closed contacts 74 to a motor reversing switch S8 which serves to normally connect the supply line 35 to a connection 79 of the motor 39 for rotating the motor in a clockwise direction. The connection 80 of the motor 39 is then shown normally connected through the motor reversing switch S8 back to the supply line 36 which is connected through a normally open switch S3 and through a rectifier D1 to the other side of the secondary 72. A push button control switch S2 is connected across the contacts of switch S3. An electromagnetic operator 83 is connected from the common junction of the contacts on one end of the switches S2 and S3 through a normally closed switch S4 to the supply line 36.

When the start push button switch S2 is closed, it energizes the electromagnetic operator 83 through a normally closed switch S4. The energizing of operator 83 closes normally open switch S3 and holds it closed after the push button switch S2 opens. This causes the motor 39 to be energized through the motor reversing switch S8 to rotate in a clockwise direction and thus move the platen 53 loaded with the film packets 10 to the left below the first pressure roller 67 as shown in FIG. 5. This causes the pods 15a and 15b to rupture along their longitudinal marginal seals 37 causing the developer material 19 to be discharged and evenly spread over the upper and lower emulsion surfaces of the film chip in the envelope. Such a spreading of the developer material 19 over the emulsion surfaces of the film chip ensures an even, efficient, development thereof.

When the platen 53 has moved such that the pods 17a and 17b in the packets 10 have advanced to a position adjacent the first pressure roller 67, an actuator 90 provided on the bottom of the platen closes a normally open microswitch S5 held on the housing by a bracket 87 in the path of the platen. The closing of microswitch S5 completes a control circuit across the a.c. supply through a time delay device 85 and through an electromagnetic operator 86 which latter operates to open the normally closed contacts 73 in the supply line 35 and keeps these contacts open for a predetermined period of time, on the order of 10 seconds, for example, as determined by the manual setting of the time delay device 85. The energizing of the electromagnetic operator 86 also switches a two position switch S7 to its closed position which completes a control circuit across the a.c. supply and energizes an electromagnetic operator 82 which operates to reverse the contacts of the motor reversing switch S8.

Upon opening the normally closed contacts 73, the power is cutoff of the supply lines leading to the motor reversing switch S8 and the motor 39 is stopped. After the time delay of device 85 has expired, its circuit opens and the normally closed contacts 73 again close causing the motor 39 to be energized to drive the platen 53 to the right in FIG. 5 since the switching of the motor reversing switch S8 causes the motor to rotate in a counterclockwise sense. The movement of the platen and therefore the actuator 90 to the right, away from the microswitch S5, causes it to now open. Note, however, that switch S7 is a two-position switch and, therefore, upon being switched by operator 86, it remains closed and maintains operator 82 energized, even after operator 86 is no longer energized. Thus motor reversing switch S8, which is spring loaded to normally remain in its position shown in FIG. 9, is held in its oppositely switched state by operator 82 as the platen moves to the right. The motor 39 thus drives the platen 53 to the right to move the fixer pods 17a and 17b of the packets 10 beneath the second pressure roller 68. The motor 39 continues to drive the platen until an actuator 84 provided on the bottom thereof contacts normally open microswitch S6, fixed to the housing by bracket 88, causing it to close.

The closing of microswitch S6 completes a control circuit through a time delay device 91 and through an electromagnetic operator 92 which serves to open up the normally closed contacts 74 in the supply line 35 and keeps these contacts open for a predetermined period of time, on the order of 20 seconds, for example, as determined by the manual setting of time delay device 91. The energizing of operator 92 also serves to switch the two position switch S7 back to its open position. This deenergizes the electromagnetic operator 82 and results in the motor reversing switch S8 switching back to its original switched state. Now then when the normally closed contacts 74 again close, which is at the end of the delay time of device 91, the motor 39 again starts up in the left direction. The movement of the platen, and thus the actuator 84, mounted on the bottom thereof, opens microswitch S6.

When the platen 53 reaches its original starting position between the pressure rollers 67 and 68, an actuator 93 mounted on the bottom of the platen opens a microswitch S4 which is attached by support 89 to the housing 51 in the path of the platen and the motor 39 stops. Note that actuator 93 may be pivotally held to project beneath the platen such that it freely swings clockwise but is fixed against counterclockwise movement and thus operates to engage and open microswitch S4 only when the platen is moving to the left as illustrated in FIG. 12.

The operation of the apparatus of the present invention will next be described. To use the film packet 10, the entire envelope 21 is inserted into the mouth of the patient for exposure of the film chip therein to X-ray in the usual manner. After a plurality of film packets 10 have been exposed in this manner they are respectively loaded on a plurality of successive locations along the platen 53 with the hole 30 in each engaging a pin 77 provided at each of the locations. The film packets 10 are held in position on the platen by spring loaded clips 69 provided at each of the locations on the platen on the sides thereof. Upon pushing down the lever 70 of the spring clip, its clamp end 75 opens to receive the bent down end of the envelope 21 of the film packet and secures it when the lever is released.

Upon pressing the start push botton switch S2 the drive circuit to the motor 39 is completed and the platen 53 is caused to move to the left. As the pods 15a and 15b move beneath the first pressure roller 67 the build up of the pressure therein breaks the longitudinal marginal seals 37 thereof and causes the viscous developer material 19 to discharge in the envelope 21 onto the upper and lower emulsion coatings 14 of the film chips. As the packet continues to advance past the pressure roller 67, the viscous developer material 20 is caused to be spread evenly over the upper and lower emulsion surfaces of the film chips inside the packets. The platen comes to rest just before pods 17a and 17b in the film packets reach the first pressure roller 67.

The travel time, i.e. the distance the platen moves to the left is controlled by the actuator 90 on the bottom thereof which closes the microswitch S5 fixed to the housing 51 and causes the normally closed contacts 73 to open thus breaking the drive circuit for the motor 39. Simultaneously therewith the contacts of the motor reversing switch S8 connecting the power supply lines 35 and 36 to the motor 39 are reversed.

After the developing time as determined by the manual setting of the time delay device 85 has elapsed, the contacts 73 close and the motor 39 is started up again, but this time in a reverse direction driving the platen 53 to the right. As the pods 17a and 17b move beneath the second pressure roller 68, the build up of the pressure in both the pods 17a and 17b breaks the longitudinal marginal seals 37 thereof and causes the viscous fixer material to discharge into the envelope and onto the upper and lower surfaces of the film chips. As the packets continue to advance to the right past the pressure roller 68, the viscous fixer material is caused to be spread evenly over the upper and lower surfaces of the film chips inside the envelopes. The platen 53 comes to rest just before pods 15a and 15b on the film packets 10 reach the second pressure roller 68. The travel time, i.e., the distance the platen moves to the right is controlled by the actuator 84 on the bottom of the platen which closes the microswitch S6 fixed to the housing and causes normally closed contacts 74 to open thus breaking the drive motor circuit. Simultaneously therewith, the contacts of the reversing switch S8 connecting the power supply to the motor 39 are again reversed.

After the fixer time, as determined by the manual setting of the time delay device 91, has elapsed, the contacts 74 close and the motor 39 now starts to drive the platen to the left. When the platen reaches its original position between the pressure rollers 67 and 68, the actuator 93 on the bottom of the platen operates to open the microswitch S4 fixed to the housing and the platen stops. Upon opening the spring clips 69, the packets can then be lifted from the platen 53. The operator then opens the film packets by the use of their pull tabs 27a and 27b and removes the X-ray film chips which can be immediately used for diagnostic purposes in a conventional viewer. It should be appreciated, however, that although the film chip can be immediately used upon being removed from the packet, some degree of care in handling must be exercised and the film chip must be washed and dried within a reasonable period of time thereafter in accordance with the usual practice to provide permanency.

Referring to FIG. 8, a modification to the processor 50 shows that a magnetic exciter 76 in the form of an electromagnet is provided in place of the first pressure roller 67 on the side of the platen 53. The circuit diagram in FIG. 9 further shows that the exciter 76 is coupled across the a.c. power provided by the secondary 72 of the transformer 71. Thus the exciter 76 is operated to produce oscillatory reversal of the polarity of the magnetic field which it generates. This modified processor is used to process the packet 40 shown in FIGS. 3 and 4. Thus when the packet 40 is placed on the platen 53, the platen first moves the packet 40 to the left past the exciter 76 which serves to set free the droplets 44 in the carrier coating layer 43 thereof by causing the freely movable magnetic particles 45 contained therein to rapidly oscillate back and forth in accordance with the reversing magnetic field set up by exciter 76, thus causing the carrier coating layer 43 to rupture and release the developer solution therein. The movement of the platen 53 is then reversed and drives the film packet 40 past the pressure roller 68 which serves to rupture the pods 41a and 41b containing the fixer material 42. Otherwise the operation of the processor with the modification shown in FIGS. 8 and 9 is the same as that previously described.

It should be especially noted that the processing of X-ray film chips requires the use of at least two processing materials. This is due to the heavy emulsion coatings on each side of the substrate of the film chip and the inherently high silver halide content of the emulsion. In this regard, it should be further noted that the film chip may be provided with an X-ray emulsion coating on the substrate thereof which contains an incorporated developer. Typically such incorporated developer may contain a reducing agent such as hydroquinone or other photographic developer compound which is added to the emulsion when the film chip is manufactured. In an embodiment of the film packet, such as described in FIGS. 1 and 2, for example, the pods 15a and 15b on the developer end of the packet only need to provide an activator, typically a high pH alkali solution such as sodium hydroxide. The advantage of such an activator in the pods is that it provides a longer shelf life, and assists in providing a more even and full development of the emulsion coating all the way to the substrate of the film chip even at short process time.

While the apparatus and procedure for developing X-ray film chips shown and described herein is admirably adapted to fulfill the objects and features of advantages previously enumerated as desirable, it is to be understood that the invention is not to be limited to the specific features shown and described but that the means and construction herein disclosed are susceptible of modification in form, proportion, and arrangement of parts without departing from the principle involved or sacrificing any of its advantages, and the invention is therefore claimed in embodiments of various forms all coming within the scope of the claims which follow.

What is claimed is:

1. A processor for developing a film chip having emulsion coatings on both surfaces thereof and enclosed in a packet together with a pair of pods containing a viscous developer solution on one end of the film chip and a pair of pods containing a viscous fixer solution on the other end thereof, said processor comprising:
   a first releasing means and a spaced apart second releasing means;
   transport means for said packet disposed between said first and second releasing means, said packet held on the transport means with the pair of pods on the respective ends thereof adjacent said first and second releasing means; and
   control means operable to move said transport means and thereby said packet in one direction past said first releasing means to release the developer solution contained in the pair of pods on one end of said packet and to cause said developer solution to be evenly spread in a thin layer over the emulsion coatings on said film chip and then to move said packet in the opposite direction past said second releasing means to release the fixer solution contained in the pair of pods on the other end of said packet and to cause said fixer solution to be evenly spread in a thin layer over the emulsion coatings on said film chip.

2. The processor in accordance with claim 1 wherein said first and second releasing means comprise a first and second pressure roller, respectively.

3. The processor in accordance with claim 1 wherein said control means is thereafter further operable to move said transport means back to its original position between said first and second releasing means.

4. The processor in accordance with claim 3 wherein said control means includes a first and second timing device, and said control means is operable after spreading said developer solution over the emulsion coatings on said film chip to terminate the movement of said transport means for a period of time preset in said first timing device and is operable after spreading said fixer solution over the emulsion coatings on said film chip to terminate the movement of said transport means for a period of time preset in said second timing device.

5. The processor in accordance with claim 1 wherein said transport means includes a platen having a rack on the bottom thereof, and motor means including a gear engaging said rack for driving said platen in said one direction and said opposite direction.

6. A processor for developing a film chip having emulsion coatings on both surfaces thereof and enclosed in a packet together with a pair of pods on one end of the film chip containing a viscous processing solution and layers of microcapsules containing processing solution and magnetic particles disposed adjacent the emulsion coatings on both surfaces thereof, said processor comprising:

an electro-magnetic exciter;

a pressure roller spaced apart from said electromagnetic exciter;

transport means for said packet disposed between said electro-magnetic exciter and said pressure roller, said packet held on said transport means with the end having the pair of pods positioned adjacent the pressure roller; and control means operable to move said transport means and thereby said packet in one direction past said electromagnetic exciter to cause said magnetic particles to oscillate and rupture said microcapsules to release said processing solution and cause a layer of developer solution to be applied over the emulsion coatings on said film chip and to thereafter move said transport means and thereby said packet in the opposite direction past said pressure roller to release the processing solution contained in the pair of pods on the one end of said packet and to cause said processing solution to be evenly spread over the emulsion coatings on said film chip.

7. A processor for developing a film chip having emulsion coatings on both surfaces thereof and enclosed in a packet together with a pair of pods containing developer material on one end of the film chip and a pair of pods containing fixer material on the other end thereof, said processor comprising:

a first pressure roller and a spaced apart second pressure roller;

a platen for holding said packet disposed between said first and second pressure rollers;

a rack on the bottom of said platen;

a motor means including a gear engaging said rack; and a control means for said motor means including a reversing switch, a supply line having a first and second set of normally closed contacts therein and connected to said motor means through said reversing switch, a first and second delay device, a start switch for closing the supply line to said motor means to drive the platen in one direction past said first pressure roller, a first electromagnetic operator operable to open said first set of contacts upon said platen moving a predetermined distance in said one direction and to hold them open for a time period determined by said first delay device and further operable to switch said reversing switch, and a second electromagnetic operator operable to open said second set of contacts upon said platen moving a predetermined distance in the opposite direction and to hold them open for a time period determined by said second delay device and further operable to switch said reversing switch;

whereby when said platen is moved in said one direction past said first pressure roller the developer material contained in the pods on one end of the packet is released and evenly spread over the emulsion coatings on both surfaces of said film chip and when said platen is moved in the opposite direction past said second pressure roller the fixer material contained in the pods on the other end of the packet is released and evenly spread over the emulsion coatings on both surfaces of said film chip.

8. The process of developing a film chip having an emulsion coating on both surfaces thereof and enclosed in a packet with a pair of developer pods containing a viscous developer material on one end thereof and a pair of fixer pods containing a viscous fixer material on the other end thereof, said process comprising the steps of:

positioning said film chip packet on a platen located between a first and second pressure roller, moving said platen past said first pressure roller to rupture the developer pods on the one end of said film chip and to evenly spread said developing material over the emulsion coatings of said film chip, stopping said platen just before the fixer pods on the other end of said film chip packet reach the first pressure roller, moving said platen after a predetermined period of time past said second pressure roller to rupture the fixer pods on the other end of said film chip and to evenly spread said fixer material over the emulsion coatings of said film chip, stopping said platen just before the developer pods on the one end of said film chip reach the second pressure roller, and moving said platen after a predetermined period of time back to its original location between said first and second pressure rollers.

9. A film packet comprising:

an X-ray film chip having emulsion coatings on both surfaces thereof;

a pair of elongated pods, each containing a viscous processing material and having a frangible seal disposed adjacent a respective emulsion coating on one end of said film chip;

a layer of microcapsules containing processing material and magnetic particles superposed adjacent each emulsion surface of said film chip; and a flexible envelope enclosing the film chip, the layers and the pair of pods, said envelope being made of material opaque to light but permeable to X-rays.

* * * * *